(12) United States Patent
Angelo et al.

(10) Patent No.: US 6,182,892 B1
(45) Date of Patent: Feb. 6, 2001

(54) SMART CARD WITH FINGERPRINT IMAGE PASS-THROUGH

(75) Inventors: Michael F. Angelo, Houston; Mark B. Tellez, The Woodlands; Steve H. Park, Spring, all of TX (US)

(73) Assignee: Compaq Computer Corporation, Houston, TX (US)

( * ) Notice: Under 35 U.S.C. 154(b), the term of this patent shall be extended for 0 days.

(21) Appl. No.: 09/047,915

(22) Filed: Mar. 25, 1998

(51) Int. Cl.$^7$ .................................................. G06K 5/00
(52) U.S. Cl. ........................ 235/380; 235/382; 235/454; 902/1
(58) Field of Search ................... 902/1, 3, 4, 5; 235/380, 382, 382.5, 454

(56) References Cited

U.S. PATENT DOCUMENTS

| | | | |
|---|---|---|---|
| 4,202,120 | * 5/1980 | Engel | 40/2.2 |
| 4,455,083 | * 6/1984 | Elmes | 356/71 |
| 4,544,267 | * 10/1985 | Schiller | 356/71 |
| 4,728,186 | * 3/1988 | Eguchi et al. | 356/71 |
| 4,904,853 | * 2/1990 | Yokokawa | 235/487 |
| 5,054,090 | * 10/1991 | Knight et al. | 382/4 |
| 5,077,803 | * 12/1991 | Kato et al. | 382/4 |
| 5,099,131 | * 3/1992 | Brownrigg et al. | 250/458.1 |
| 5,114,188 | * 5/1992 | Koch | 283/68 |
| 5,230,025 | * 7/1993 | Fishbine et al. | 382/4 |
| 5,267,324 | * 11/1993 | Kumagai | 382/4 |
| 5,485,312 | * 1/1996 | Horner et al. | 359/561 |
| 5,509,083 | * 4/1996 | Abtahi et al. | 382/124 |
| 5,528,355 | * 6/1996 | Maase et al. | 356/71 |
| 5,546,471 | * 8/1996 | Merjanian | 382/124 |
| 5,610,993 | * 3/1997 | Yamamoto | 382/124 |
| 5,629,764 | * 5/1997 | Bahuguna et al. | 356/71 |
| 5,650,842 | * 7/1997 | Maase et al. | 356/71 |
| 5,732,148 | * 3/1998 | Keagy et al. | 382/124 |
| 5,879,453 | * 3/1999 | Streeter et al. | 118/31.5 |
| 5,920,642 | * 7/1999 | Merjanian | 382/126 |

OTHER PUBLICATIONS

Drake, Marvin D., "Waveguide Hologram Fingerprint Entry Device", Society of Photo–Optical Instrumentation Engineers, Sep. 1996, pp. 2499–2505.

Chennankara et al, "Optical Fingerprint Recognition Using A Waveguide Hologram", Applied Optics, vol. 34, No. 20, Jul. 1995, pp. 4079–4082.

Brislawn, Christopher M., "Fingerprints Go Digital", url http://e–math.ams.org/notices/199511/brislawn.html, downloaded Jan. 28, 1998, pp. 1–7.

Peyret, Patrice, "Which Smart Card Technologies Will You Need To Ride The Information Highway Safely?", url http://www.dice.ucl.ac.be/crypto/cascade/scard95.htm. downloaded Jan. 26, 1998, p. 1–17.

"Solid State FingerPrint Sensor, FPS100A", Veridicom, Inc. Specification Dec. 8, 1997, p. 1–6.

* cited by examiner

Primary Examiner—Thien M. Le
Assistant Examiner—Daniel S Felten
(74) Attorney, Agent, or Firm—Conley, Rose & Tayon, P.C.

(57) ABSTRACT

A fingerprint authentication methodology in which a smart card with a credit card form factor is used to transmit the imprint of a fingerprint to a live-scan device. Use of a credit card form avoids direct contact of the imprint with the live-scan device, reducing wear and tear on the live-scan device. Use of a "smart" card to store an imprint template enables the owner of user to maintain control of the print.

17 Claims, 5 Drawing Sheets

SMART CARD WITH FINGERPRINT IMAGE PASS-THROUGH

BACKGROUND AND SUMMARY OF THE INVENTION

This application relates to smart card fingerprint authentication, in particular, to imprint and other biometric digitization and verification.

BACKGROUND: SECURITY

Computers are being used in increasing numbers for financial transaction, data storage, and physical access controls. As such, the number of tools used in implement security for these applications has grown. Three of the most common bases for security are knowledge, physical keys or "security tokens", and biometrics. In some applications these methods are used individually whereas in others they are combined to create a stronger level of security.

BACKGROUND: KNOWLEDGE

One of the simplest ways to maintain security is based on the knowledge of the person desiring access. The most common form of this type of security is authentication through password, or in the case of financial transactions, personal identification number (or "PIN") information. One of the biggest disadvantages to knowledge based security systems is the difficulty in protecting the password information from other. Password information can be captured in a variety of ways, usually without the owner's knowledge. A common method of intercepting password information is by capturing a datastream containing the password. Another disadvantage of knowledge based security systems is that they usually rely on the user of the system to remember a password. The user, in turn, is more likely to choose a password which is easy to remember. Such passwords usually involve birth dates, maiden names, street names, etc. However, a password which is easy to remember may be easy to devine given minimal knowledge about the user. This results in reduced levels of security.

BACKGROUND: PHYSICAL KEYS

The use of physical keys, such as house or car keys, is a way of gaining access to a physically secure site. Security tokens, or electronic keys, are another type of physical key which can be used control access to both physical and electronic information. Security tokens are portable devices which can be connected to computer terminals but remain detachable and can be carried around by individuals. Security tokens are useful, for example, when attempting access to a database or other electronic store of information, the user is usually required to provide only a username and password. Token authentication via a security token offers a stronger level of security by requiring additional pieces of information.

The security token (like an ATM card) is usually encoded with a PIN which the user must know. It can also information in on-chip memory. Cards which include logic and non-volatile memory are known as "smart cards" and are widely used in some countries. The token is also usually encoded with a unique number which is stored on the card for authentication. Not only must the security token be present for authentication, but information on the security token must be electronically read and verified before access to information is granted. This unique number encoding prevents "fake IDs" from being easily generated.

The main disadvantage of the security token is that it can be easily lost or stolen. If extra security, such as PINs and unique one-time numbers are not included with the token, it can then be used to gain access to that which was protected. Even if a PIN is used, that number can sometimes be captured as well, if proper protection of it is not maintained.

BACKGROUND: BIOMETRICS

Biometrics can be defined as the use of unique physiological or behavioral characteristics for identification purposes. Biometrics represents one of the most secure and reliable ways of verifying the identity of a particular individual. As such, it is somewhat immune from the problems of both knowledge-based and token-based security functions. Physiological characteristics are considered more reliable as they remain relatively stable throughout life.

Physiological characteristics include handwritten signatures, fingerprints, the filaments of the eye, or the spatial features of a face. Of the various physiological characteristics that can be measured, the fingerprint is recognized as the most reliable, unique, undeniable, and unchanging characteristic for identifying persons.

The advantages of biometrics as a security device have caused an increasing demand for use of fingerprints and other physiological features for identification and access purposes. The use of a fingerprint as a means of identifying an individual requires that a reference fingerprint (or "template") first be obtained. The template must be taken of an identified individual to ensure that an identification made days or years later is accurate. The FBI has created a standard for the digitization of the template in order for automatic electronic comparisons of fingerprints to take place. This standard uses an approach known as wavelet transform/scaler quantization (WSQ). WSQ allows fingerprint information to be encoded for later recognition in a compact manner (e.g., with around 1 megabyte of computer storage space per print). Ease of storage and recognition coupled with an electronic means of verification have fueled consumer desires for the use of fingerprinting.

BACKGROUND: LIVE-SCAN IMPRINTS

Generally, in commercial applications the fingerprint image to be verified is acquired with live-scan devices. The finger to be scanned is placed on a clear glass or acrylic surface (the "platen"). An image of the imprint of the finger is illuminated and then captured, usually by a CCD camera. The image is then digitized using WSQ or another method. This image is then compared to a template for verification.

The main advantage of live-scan systems is that the imprint captured is difficult to falsify, especially when combined with other vital measurements, such as temperature, pulse, etc. However, wide-scale use of commercial live-scan systems in unrestricted environments faces several disadvantages. First, the platen must be constantly exposed to the surrounding environment in order to make it accessible to the users of the system. In areas with severe environmental conditions premature platen wear can occur and affect the ability of the device to capture images. Additionally, when the same platen is used for each verification, it can become worn. The image captured from the platen can become distorted due to scratches, cracks, or even buildup of oils and dirt. Once the platen becomes too worn to pass a clear image, verifications can no longer be performed until the platen is replaced or repaired.

BACKGROUND: APPLICATIONS

The ability to reduce a template and a live-scan image to a compact and easily transmittable and stored size allows fingerprinting to be used for identification and verification purposes in many different contexts. For example, access to data in databases and other systems can be controlled. Requiring fingerprint verification in these situations provides a stronger level of security than password type systems. In response to consumer demand, Oracle has integrated biometric authentication into the Oracle 7™ Advanced Networking Option™ release of its database management system software. Fingerprint verification can also be used to restrict or monitor access to physical areas such as buildings or cabinets containing controlled substances.

Another application of fingerprinting is in situations where verification that the person really is who they say they are and their presence is required. Such situations include time and attendance tracking. Banking and securities trading, especially when transactions occur remotely, can benefit from fingerprint verification as well. Finally, fingerprint verification can be used in place of voter registration certificates and in other situations where the identification of a single person with the proper credentials is essential. Such situations can include doctors, patients, vehicle drivers, and customs operations.

Smart Card With Fingerprint Image Pass-Through

The present application describes a method for providing live-scan fingerprint authentication while protecting the imprint reading platen of the imprint scanning device. A credit card sized security token or "smart" card is used to access the live-scan device in order to achieve verification. The insertion of the card into the live-scan device activates it for imprint scanning. A finger is placed on the platen of the card. An optical path inside the card transmits a light source from the live-scan device into the card to illuminate the imprint. The image of the imprint is transmitted back through the card to the imprint reading platen of the live-scan device. From there, the print can be authenticated according to any number of criteria.

This method of fingerprint authentication offers several advantages over the present methodologies. First, biometric and token security (including unique number encoding and password or PIN information) can be combined to provide a higher level of security and consumer peach of mind. Another advantage is that wear of the platen of the live-scan device itself is significantly reduced since the paten is not directly part of the human interface. This reduction in wear can result in savings due to frequency of repair and increased reliability. In some embodiments, the live-scan device may not even require a platen. Another advantage is reduced wear of the live-scan reading assembly. Both the platen and the light source can be at least partially protected by the live-scan device. This helps to prevent tampering and other forms of degradation due to ready accessibility from users of the system or passersby. An advantage of transmitting the image to a live-scan device is heightened security against a spurious card being placed into a mode in which it emulates or verifies a print regardless of the actual image sensed. Another advantage is that the security token is more accessible and easier to clean than a live-scan platen. Latent images left on a live-scan platen can create as much security risk as printing ATM receipts which include the user's password. With the disclosed method, any latent image remains with the consumer, not on the live-scan platen. Finally, the card alone can be used for some lower-security identification purposes, without use of the fingerprint.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1A:
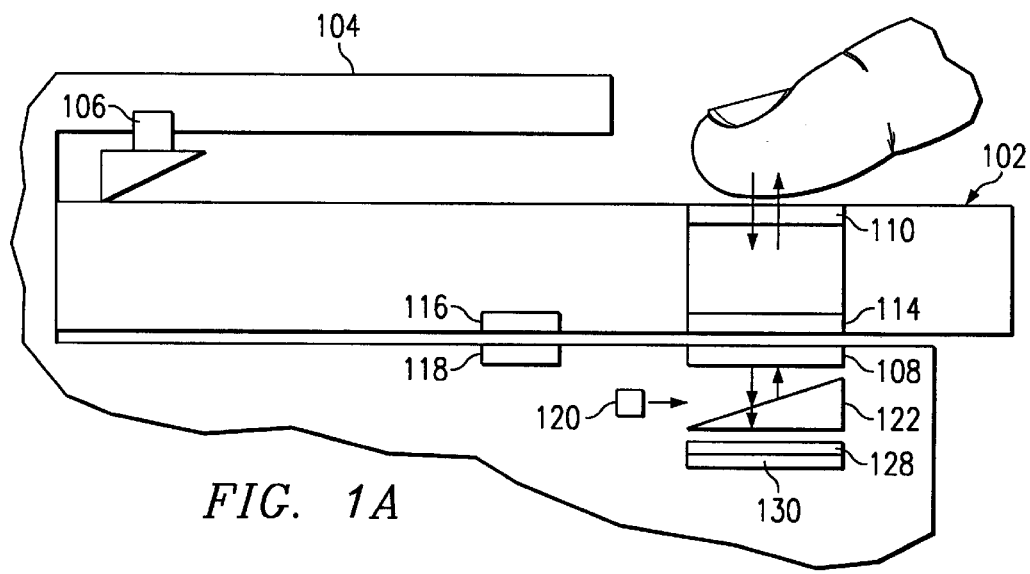
FIGS. 1A–E depicts an embodiment of the disclosed methodology for providing fingerprint authentication via a card.
Figure 1B:
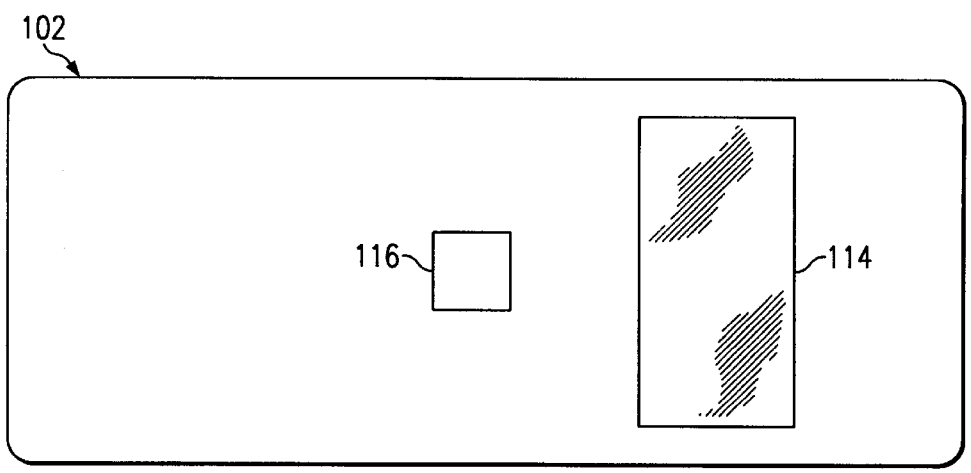
Figure 1C:
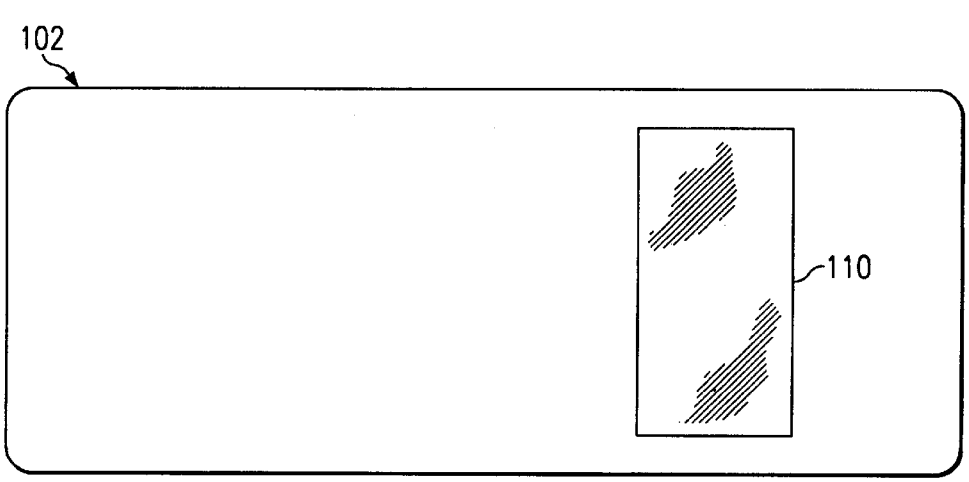

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed invention. Moreover, some statements may apply to some inventive features but not to others.

ADDITIONAL BACKGROUND: SMART CARDS

Smart cards are used in a wide variety of areas, such as banking, government identification (professional, driving, and sporting licenses), insurance and medical information, and pay-phone and pay-tv. They are the best known example of security tokens. Currently, smart cards have the approximate look and feel of a standard plastic bank card. However, the smart card is embedded with a secure (tamper-resistant) silicon chip. The smart card holds information in electronic form and can control access to the information and how the access is granted. Today's smart cards are wide ranging in their degrees of "intelligence". The most basic cards, for example, pay phone cards, are almost impossible to copy or falsify but offer no protection in case of loss or theft. More advanced cards may offer multiple password protection, manage several applications and offer authentication and one-way cryptography techniques for security. The amount of storage space on some cards is now often greater than 1 megabyte.

Smart cards are capable of holding information which once loaded, cannot be changed by a card reader or can never be accessed. Therefore, the smart card offers advantages for carrying information such as security coding and fingerprint templates. The WSQ method of fingerprinting storage offers the advantage of compression of the image at a rate of about 0.75 bits per pixel, or about 1 megabyte per fingerprint. The product of WSQ is a mathematical characterization (or "template") of the print along with the necessary filter coefficients, quantization parameters, and Huffman tables. This mathematical characterization allows universal reconstruction of fingerprint images that have been created by any compliant decoder.

In the case of fingerprint templates, the user of the card is afforded extra security by being granted control over the template information. Further, the card readers would not need to search a database of fingerprint templates for a match, or even need to access and transfer any particular template. Authentication can be accomplished by comparing the live-scan print to the template stored in the card.

Security of the smart card can be heightened by requiring PIN information to be entered and sent along with the stored template. Smart cards can also carry the one-time number encoding of a security token described above, adding yet another layer of security to the verification. Further, the PIN can be used as a description key to unlock information on the card such as the template or the one-time number. These techniques can be used to create two and three piece authentications. As the processing power of a smart card increases, the card itself could be programmed to self-authenticate a live-scan print with its internal template, thereby maintaining complete control of the template.

A vast amount of engineering effort has been invested in smart cards, and this area is one of increasing activity and demands. For more discussion of the requirements of this areas; see, e.g., Hendry, SMART CARD SECURITY AND APPLICATIONS (1997); and W. Rankel & W. Effing, SMART CARD HANDBOOK (1997).

Imprint Capture

In the present disclosure, capture of a fingerprint imprint on the surface of a card is achieved in several different ways. In all of the described embodiment, the image is transmitted to a live scan device either optically or electronically for comparison against a known template or templates. Ideally, the transmission of an imprint is combined with PIN information and unique number encoding of the token to heighten the level of security offered by the card. In the first disclosed embodiment, the card itself is transparent where the imprint is made. This transparency allows the image of the imprint to pass through the card to the live-scan device. In another embodiment, the transparency of the card is angled, allowing a finger to be imaged to more comfortably rest on the card when it is inserted into the live-scan device. For this embodiment, the optics of the live-scan device must be calibrated to properly received the image. In another embodiment, a gradient index lens is used in the transparency in order to create a greater offset between the imprint on the card and the live-scan device without the need for adjusting the live scan optics for the angle of the image.

In another embodiment, line-scanning of the imprint is used to transmit the image to a live-scan device. Light is transmitted through the card by parallel fiber optic lines to an LCD panel. The panel is charged such that only one strip of the panel at a time allows light to pass through the panel and illuminate the imprint. The light which is reflected from the imprint passes back through the panel and is received by the fiber optic lines. The fiber optic lines transmit the partial image through the card and terminate at an image port where each partial image can be captured by the live-scan device and constructed into a complete image for verification.

In another embodiment, light a transmitted through the card by a single fiber optic line to an LCD panel. The panel is charged such that only one pixel of the panel at a time allows light to pass through it and illuminate the imprint. The light which is reflected from the imprint passes back through the panel and is received by the fiber optic line. The fiber optic line transmits the one-pixel images, one at a time, through the card and terminates at an image port where each one-pixel image can be captured by the live-scan device and constructed into a complete image for verification.

In another embodiment, light from the live-scan device passes through a fiber optic bundle into a glass substrate. Light from the substrate passes through a waveguide hologram to illuminate the imprint. The image of the imprint is captured at the end of the substrate and is transmitted back through the fiber optic bundle to an image port. In another embodiment similar to the previous, an LCD panel between the waveguide hologram and the imprint is used to allow transmission of one strip of the imprint image at a time. The partial image is captured at the end of the substrate and is transmitted back through the fiber optic bundle to an image port.

BACKGROUND: LIVE-SCAN IMPRINT CAPTURE

Figure 9:
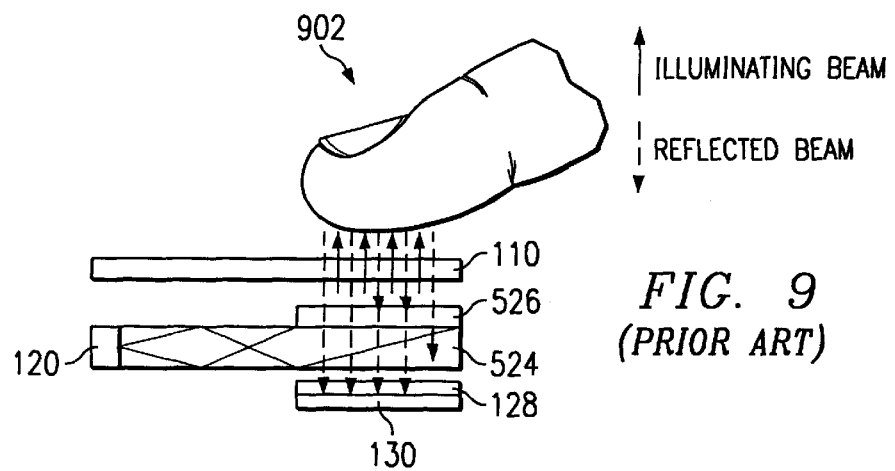
FIG. 9 depicts the fingerprint illumination and imprint capture process.

FIG. 9 depicts a live-scan fingerprint illumination and imprint capture process described in Marvin D. Drake et al., WAVEGUIDE HOLOGRAM FINGERPRINT ENTRY DEVICE, Opt. Eng., September 1996, at 2499, which is incorporated herein by reference, that can be used with the preferred embodiment of the disclosure. The finger 902 to be sampled is placed on a clear platen 110. The platen can be of acrylic or glass, or any other clear hard substance that is durable, relatively scratch resistant, transparent, and will not introduce excessive distortion into the captured imprint. The platen is necessary in this instance to protect the underlying optical substrates and electronics from direct contact which could distort images or damage circuitry. A laser diode 120 connected to a waveguide substrate 524, generally made of glass, is used to transmit a light source into the waveguide substrate 524 to illuminate the imprint of the finger 902. Light from the input light source beam travels the length of the waveguide substrate 524 to a hologram 526. The hologram 526 is of a uniform beam of light and can be either perpendicular to or tilted from the waveguide substrate 524. The use of this hologram allows the imprint capture to take place with a single beam of light. At the hologram 526, a portion of the light in the waveguide is directed by the hologram nearly perpendicular, depending on the recording angle, to the platen 110. Light reflected and scattered from the imprint of the finger being sampled 902 then passes back through the platen 110, the hologram, 526, and the waveguide substrate 524 through a microlens array or fiber taper 128 and is acquired in a CCD array 130. Once the print is acquired, it can be compared with the template and access granted or denied based on the results of the comparison.

In some devices, the print is captured by a CCD array through frustrated total internal reflection (FTIR) at the surface of a prism. That is, by using the prism TIR method to illuminate the finger, however, trapezoidal distortion in the print is introduced, which must then be corrected by additional optics or print acquisition software. The waveguide hologram method offers the advantage of allowing the light source to be introduced by an fiber optic or ("light pipe") bundle instead of being coupled to the print reader directly.

FIGS. 1A–E

FIG. 1 depicts the preferred embodiment of the disclosed methodology for providing fingerprints authentication via a credit card form factor. A card 102 (with a credit card form factor) is partially inserted into the slot of a live-scan device 104. An actuator switch 106 is situated in the interior of the card slot. The switch is angled such that the insertion of the card 102 causes the switch to move into a position which activates the live-scan device hardware. The angle of the actuator switch 106 also forces the card against the live-scan platen 108 in the interior of the card slot. FIG. 1B depicts the bottom side of the card 102 of FIG. 1A. The card is inserted such that the image port 114 of the card is aligned with the live scan platen 108 and the card chip head 116 is aligned with the live-scan chip reader 118. The card chip head allows information to be read from and written to the chip in the "smart" card 102. FIG. 1C depicts the top of the card 102. On the top of the card 102 is an imprint platen 110. The interior of the card 102 is optically transparent below the imprint platen 110 such that the imprint of a finger can be illuminated and read by the live-scan reader. When a card is inserted into the live-scan device, a laser diode 120 emits a beam of light. The light is reflected by a beamsplitter prism 122 through the card 102. The light then passes through the live-scan platen 108, the beamsplitter prism 122, a microlens array or fiber taper 128, and onto a CCD array 130. The live-scan device can then verify the imprint against the template information received from the card.

Figure 1D:
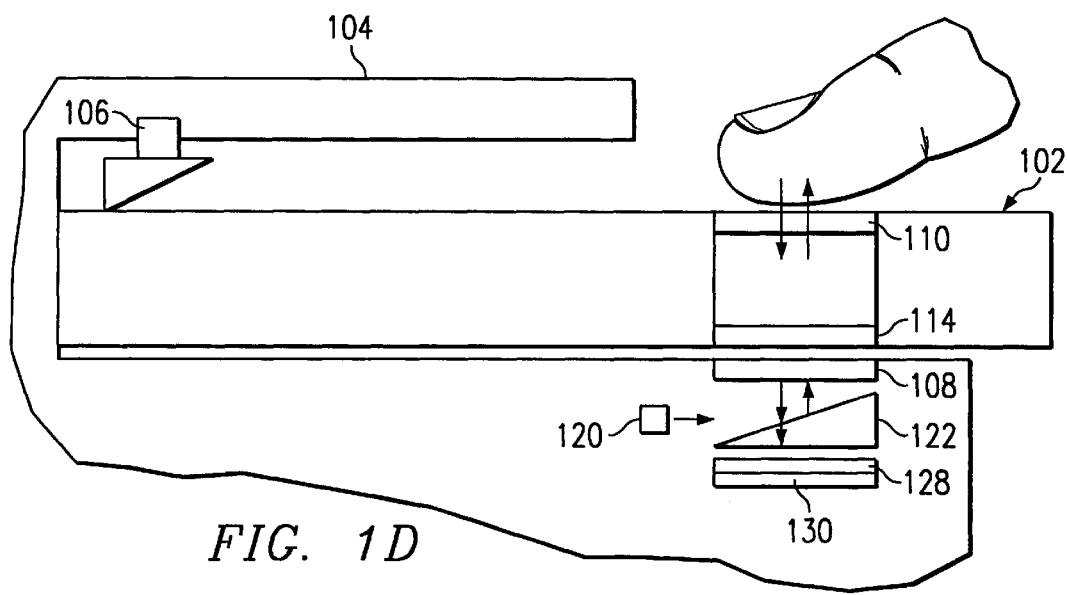
Figure 1E:
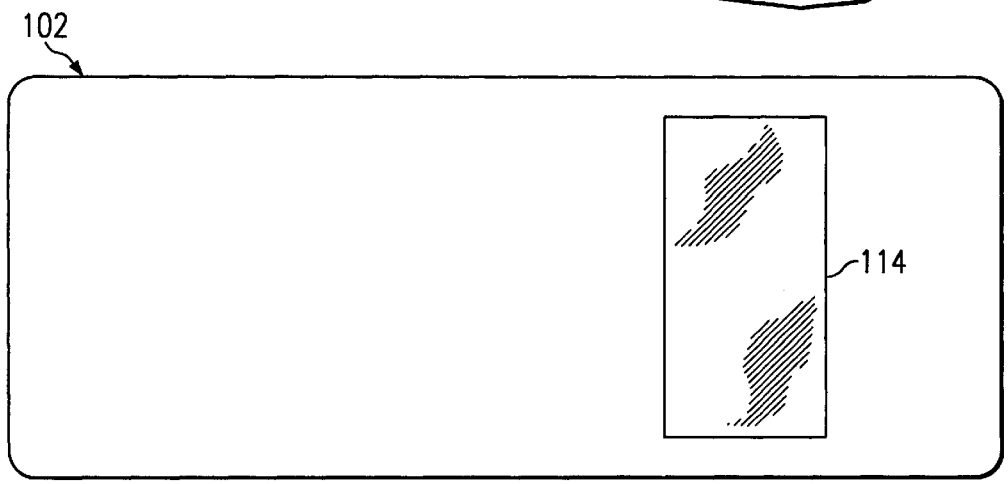

FIG. 1D depicts an alternative embodiment of the disclosed methodology for providing fingerprints authentication via a card. The card 102 of FIG. 1D does not contain a chip and is not a "smart" card. FIG. 1E depicts the bottom side of the card 102 without chip 116.

FIG. 2

Figure 2:
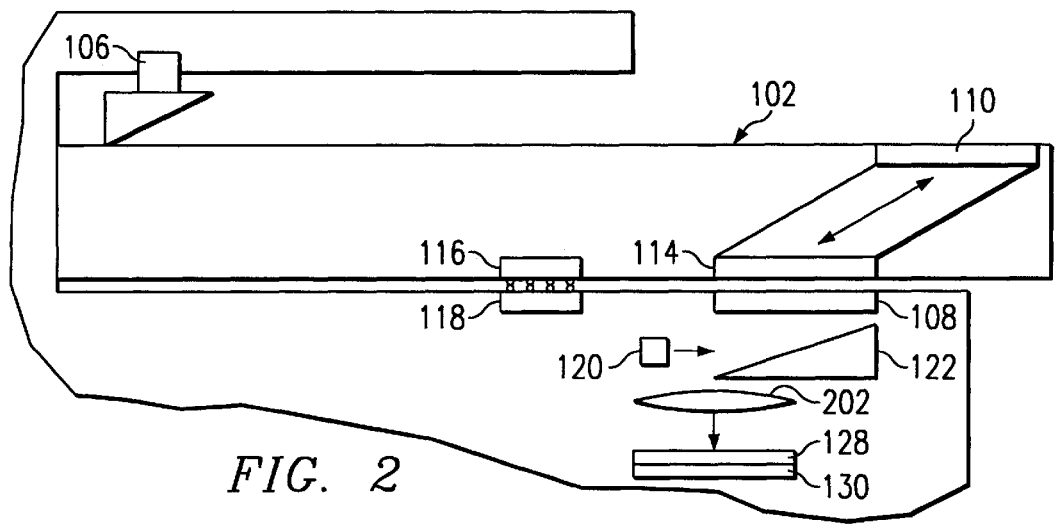
FIG. 2 depicts an alternative embodiment of the disclosed methodology for providing fingerprint authentication via a card.

FIG. 2 depicts an alternative embodiment of the disclosed methodology for providing fingerprint authentication via a card. The card 102 of FIG. 2 is a "smart" card containing the owner's imprint template, as in FIG. 1A. The card 102 is partially inserted into the slot of a live-scan device 104. When the card is properly inserted, the image port 114 is aligned with the live-scan platen 108. The imprint platen 110 is offset from the image port by approximately one inch. The interior of the card 102 is optically transparent between the imprint platen 110 and the image port 114 such that the imprint of a finger can be illuminated and read by the live-scan device 104. When a card is inserted into the live-scan device, a laser diode 120 emits a beam of light. The light is reflected by a beamsplitter prism 122 through the live-scan platen 108 into the card 102 through the image port 114. An imprint on the imprint platen 110 will scatter and reflect light through the prism series 132 back through the image port 114. The light then passes through the image onto a microlens array or fiber taper 128. The image is then transmitted onto a CCD array 130. The live-scan device can then verify the imprint against the template information received from the card.

Figure 3:
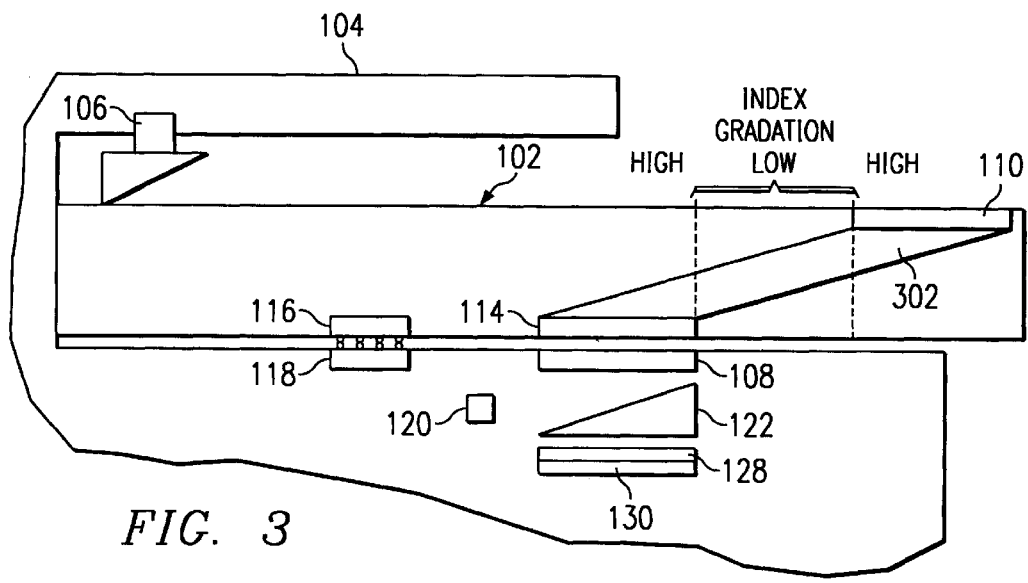
FIG. 3 depicts an alternative embodiment of the disclosed methodology for providing fingerprint authentication via a card.

FIG. 3 depicts an alternative embodiment of the disclosed methodology for providing fingerprint authentication via a card. The card 102 of FIG. 3 is a "smart" card containing the owner's imprint template, as in FIG. 1A. The card 102 is partially inserted into the slot of a live-scan device 104. When the card is properly inserted, the image port 114 is aligned with the live-scan platen 108. The imprint platen 110 is offset from the image port by approximately one inch. The imprint platen 110 and the image port 114 are connected by a gradient index optical path 302. The path is optically transparent such that the imprint of a finger can be illuminated and read by the live-scan device 104. When a card is inserted into the live-scan device, a laser diode 120 emits a beam of light. The light is reflected by a beamsplitter prism 122 through the live-scan platen 108 into the card 102 through image port 114. Light transmitted from the live-scan device 104 is directed through the gradient index optical path 302 to illuminate an image on the imprint platen 110. An imprint on the imprint platen 110 will scatter and reflect light through the gradient index optical path 302 back through the image port 114. The light then passes through the live-scan platen 108, the beamsplitter prism 122, a microlens array or fiber taper 128, and onto a CCD array 130. The live-scan device can then verify the imprint against the template information received from the card.

FIGS. 4A–C

Figure 4A:
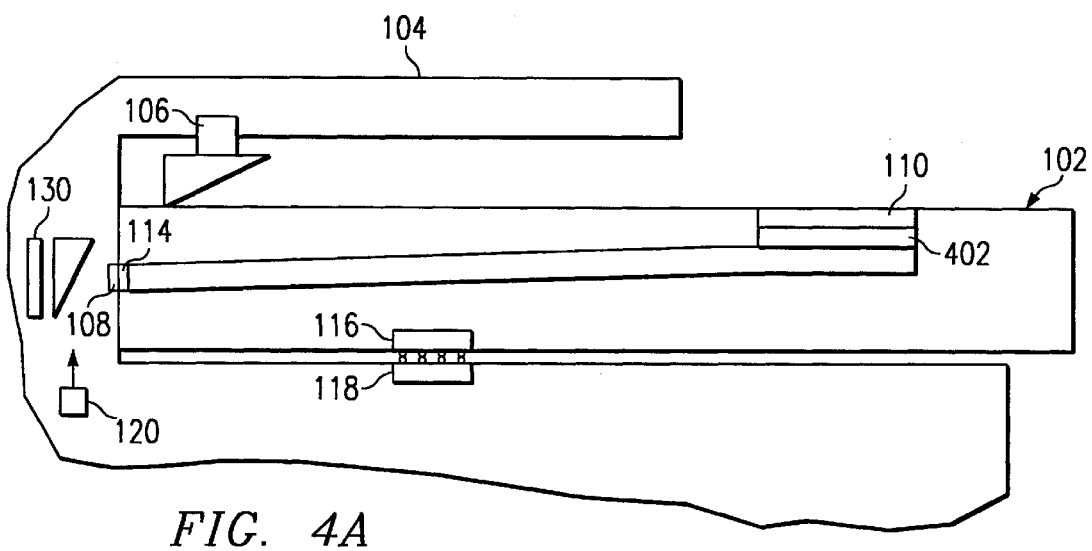
FIG. 4A–C depicts an alternative embodiment of the disclosed methodology for providing fingerprint authentication via a card.
Figure 4B:
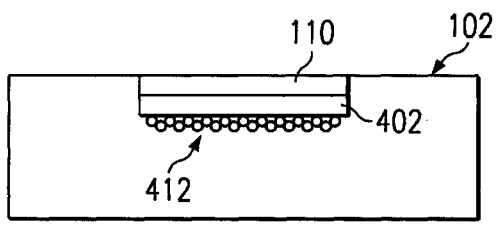
Figure 4C:
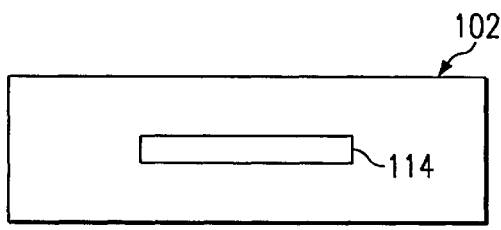

FIG. 4A depicts an alternative embodiment of the disclosed methodology for providing fingerprint authentication via a card. The card 102 of FIG. 4A is a "smart" card containing the owner's imprint template, as in FIG. 1A. The card 102 is partially inserted into the slot of a live-scan device 104. When the card is properly inserted, the image port 114 is aligned with the live-scan platen 108. When a card is inserted into the live-scan device, a laser diode 120 emits a beam of light. The light is reflected by a beamsplitter prism 122 through the live-scan platen 108 and the image port 114 into the fiber optic bundle 412 of the card 102. The fiber optic bundle 412 connects to the underside of an LCD panel 402. An index matching doping material is used to connect the optical fibers 412 to the LCD panel 402. This doping material allows the fibers to become "leaky" and allow light to pass into and out of the fibers. FIG. 4B depicts a cross section of the card 102 showing the bundle of parallel fiber optic lines 412 attached to the underside of the LCD panel 402. FIG. 4C depicts the inserted end of the card 102. The image port 114 is positioned at the end of the card. LCD panel 402 allows an imprint on the imprint platen 110 to be imaged a line at a time. When an imprint is imaged, the entire LCD panel is darkened except for a single strip which remains optically clear, allowing light reflected and scattered from the imprint to pass through the LCD panel 402. This reflected and scattered light travels back through the fiber optic bundle 412 to the live-scan device 104. The light then passes through the live-scan platen 108, the beamsplitter prism 122, and onto a CCD array 130. The image received by the CCD array 130 represents only a single strip of the imprint. To acquire an image of the entire imprint, the strip of LCD panel which is not darkened is shifted so as to allow image capture of the next adjacent strip of the imprint. This process is repeated until the entire imprint has been imaged. The live-scan device can then assemble the image strips into an image of the imprint and verify it against the template information received from the card.

FIG. 5

Figure 5:
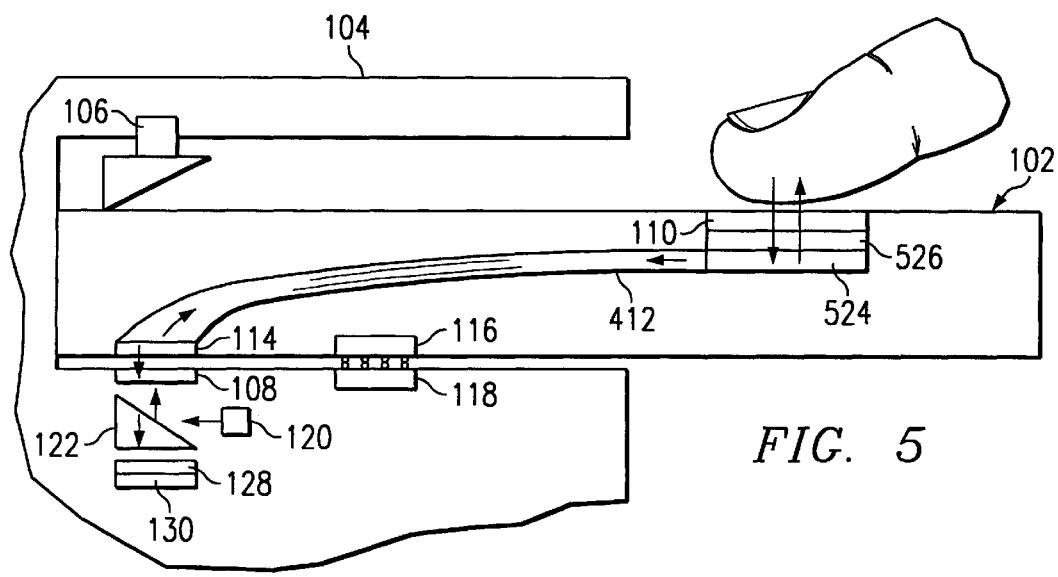
FIG. 5 depicts an alternative embodiment of the disclosed methodology for providing fingerprint authentication via a card.
Figure 7:
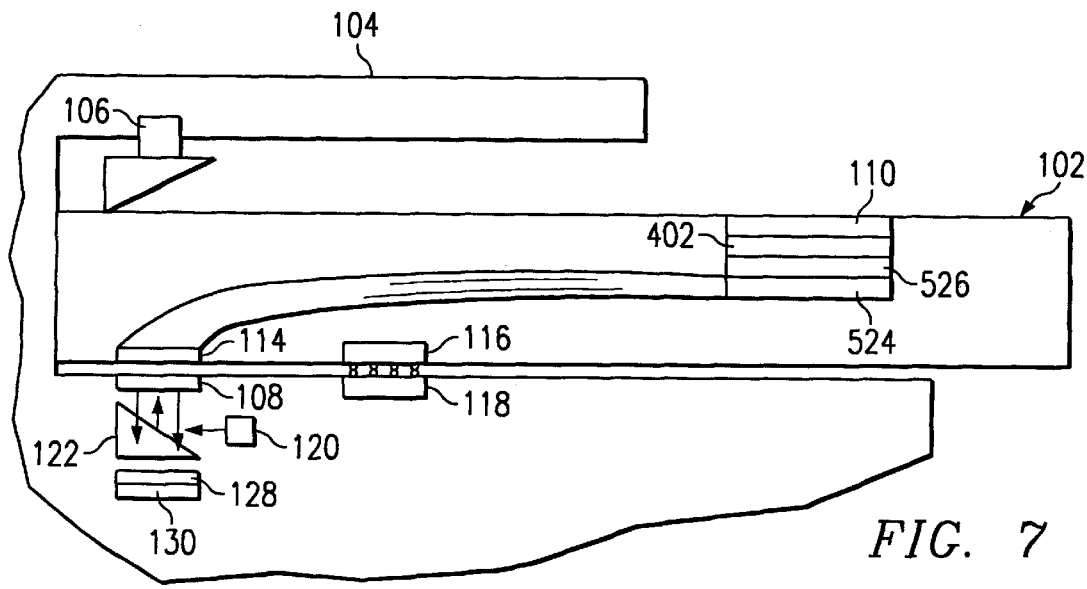
FIG. 7 depicts an alternative embodiment of the disclosed methodology for providing fingerprint authentication via a card.

FIG. 5 depicts an alternative embodiment of the disclosed methodology for providing fingerprint authentication via a card. The card 102 of FIG. 5 is a "smart" card containing the owner's imprint template, as in FIG. 1A. The card 102 is partially inserted into the slot of a live-scan device 104. When the card is properly inserted, the imprint platen 110 aligns with the live-scan platen 108. The imprint platen is made of optically clear plastic and allows light from a fiber optic bundle 412 to pass light to an reflections from the imprint to be captured. When a card is inserted into the live-scan device, a laser diode 120 emits a beam of light. The light is reflected by a beamsplitter prism 122 through the live-scan platen 108 and the image port 114 into the fiber optic bundle 412 of the card 102. The fiber optic bundle 412 connects to a waveguide substrate 524 which allows the light to fan out and reflect through a waveguide hologram of a uniform beam of light 526. The light passing through the hologram 526 reflects and scatters off the imprint on the platen 110 and is captured back through the hologram 526 and substrate 524. This reflected and scattered light travels back through the fiber optic bundle 412 to the live-scan device 104. The light then passes through the live-scan platen 108, the beamsplitter prism 122, a microlens array or fiber taper 128, and onto a CCD array 130. The live-scan device can then verify the imprint against a stored template.
FIG. 7

Figure 8:
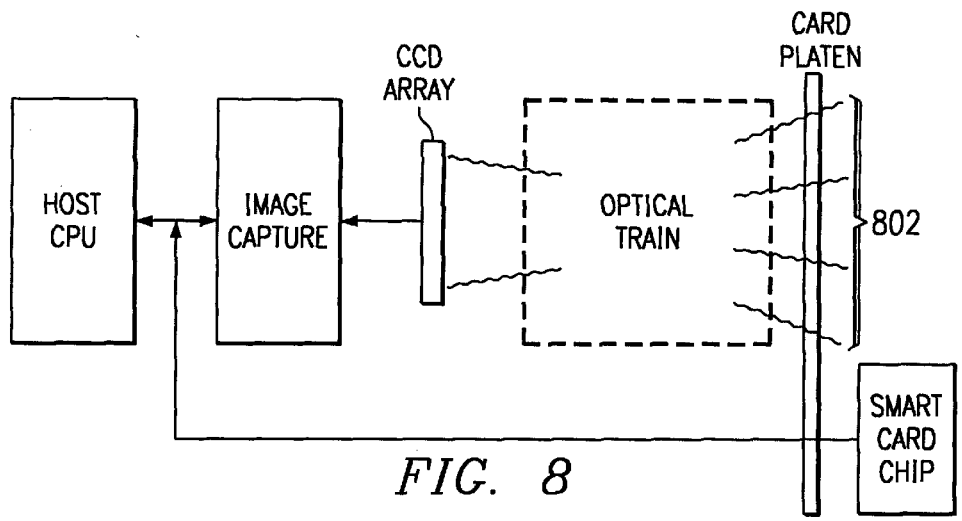
FIG. 8 depicts a system block diagram of a live-scan device which can utilize the disclosed invention.

FIG. 7 depicts an alternative embodiment of the disclosed methodology for providing fingerprint authentication via a card. The card 102 of FIG. 7 is a "smart" card containing the owner's imprint template, as in FIG. 1A. The card 102 is partially inserted into the slot of a live-scan device 104. When the card is properly inserted, the image port 114 is aligned with the live-scan platen 108. When a card is inserted into the live-scan device, a laser diode 120 emits a beam of light. The light is reflected by a beamsplitter prism 122 through the live-scan platen 108 and the image port 114 into the fiber optic bundle 412 of the card 102. The fiber optic bundle 412 connects to a waveguide substrate 524 which allows the light to fan out and reflect through a waveguide hologram of a uniform beam of light 526. An LCD panel 402 is used to control the illumination of an imprint. The LCD panel 402 allows an imprint on the imprint platen 110 to be imaged a line at a time. When an imprint is imaged, the entire LCD panel 402 is darkened except for a single strip which remains optically clear, allowing the light to pass through from the hologram 526 illuminate a strip of the imprint. Light reflected and scattered from the imprint passes through the clear strip of the LCD panel 402 and is coupled back through the hologram 526 and substrate 524. This reflected and scattered light travels back through the fiber optic bundle 412 to the live-scan device 104. The light then passes through the live-scan platen 108, the beamsplitter prism 122, a microlens array or fiber taper 128, and onto a CCD array 130. The image received by the CCD array represents only a single strip of the imprint. To acquire an image of the entire imprint, the strip of LCD panel which is not darkened is shifted so as to allow image capture the next adjacent strip of the imprint. This process is repeated until the entire imprint has been imaged. The live-scan device can then assemble the image strips into an image of the imprint and verify it against the template information received from the card.
FIG. 8

Figure 6:
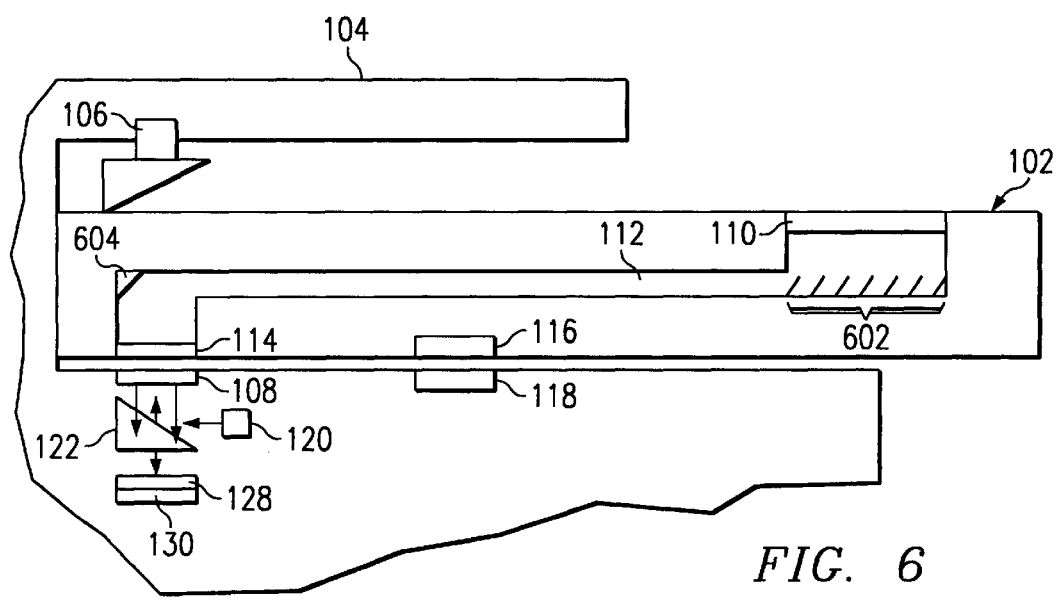
FIG. 6 depicts an alternative embodiment of the disclosed methodology for providing fingerprint authentication via a card.

FIG. 8 depicts a system block diagram of a live-scan device which can utilize the disclosed invention. A fingerprint image 802 is passed through an optical train onto a CCD array. The image can then be digitized by the image capture unit. The digitized representation is passed to the Host CPU for authentication. The Host CPU then retrieves a stored template for authentication purposes. Optionally, a smart card chip holding an authentication template can provide the template to the Host CPU for authentication.
FIG. 6

FIG. 6 depicts an alternative embodiment of the disclosed methodology for providing fingerprint authentication via a card. The card 102 of FIG. 6 is a "smart" card containing the owner's imprint template, as in FIG. 1A. The card 102 is partially inserted into the slot of a live-scan device 104. When the card is properly inserted, the image port 114 is aligned with the live-scan platen 108. When a card is inserted into the live-scan device, a laser diode 120 emits a beam of light. The light is reflected by a beamsplitter prism 122 through the live-scan platen 108 and the image port 114. A reflector mirror mounted at a forty-five degree angle 604 directs the light down a light pipe 112. At the non-inserted end of the card 102, a series of strips of electro-optic material mounted at an angle 602 are used to direct the light onto the imprint platen 110. Each strip 602 is transparent unless charged. Once charged, it becomes reflective. This reflectivity allows the light from the light pipe 112 to illuminate a strip of the imprint platen 110. A strip of the imprint image on the imprint platen 110 is reflected back through the light pipe 112. The reflector mirror 604 directs the image through the image port 114 to the live-scan device 104. The light then passes through the live-scan platen 108, the beamsplitter prism 122, and onto a CCD array 130. The image received by the CCD array 130 represents only a single strip of the imprint. To acquire an image of the entire imprint, the electro-optic strips are charged in sequence so as to allow image capture of the next adjacent strip of the imprint. This process is repeated until the entire imprint has been imaged. The live-scan device can then assemble the image strips into an image of the imprint and verify it against the template information received from the card.

Further details of the system context, and of options for implementation, may be found in B. Chennankara et al., OPTICAL FINGERPRINT RECOGNITION USING A WAVEGUIDE HOLOGRAM, Applied Opt., July 1995, at 4079, which is hereby incorporated by reference.

According to a disclosed class of innovative embodiments, there is provided; a security token, comprising: a portable module; an imprint platen on one side of said module which allows light to pass through; and an optical path from said platen to an image port on the outside of said module which allows an image of an imprint on said platen to pass to said image port.

According to another disclosed class of innovative embodiments, there is provided: a security token, comprising: a portable module; an imprint platen on one side of said module which allows light to pass through; an optical path from said platen to an image port on the outside of said module which allows an image of an imprint on said platen to pass to said image port; and an electro-optical materials which controls the transmission of light from a light source and said imprint.

According to another disclosed class of innovative embodiments, there is provided: a method of fingerprint authentication, comprising the steps of: inserting one end of a portable module into a live-scan device; and optically transmitting an image of a finger-print imprint on an imprint platen in said module through an interface layer on one side to said live-scan device.

According to another disclosed class of innovative embodiments, there is provided: a method of fingerprint authentication, comprising the steps of: inserting a portable module into a live-scan device; imaging a fingerprint on an imprint platen on one side of said module through an optical train to an image port; wherein said optical train includes an electro-optical shutter which exposes only sequentially selected portions of said fingerprint; and optically transmitting said sequentially selected portions of said image to the fingerprint reader input of said live-scan device.

According to another disclosed class of innovative embodiments, there is provided: a method of secure fingerprint authentication, comprising the steps of: inserting a portable module into a live-scan device; optically transmitting a live image of a fingerprint imprint on an imprint platen in said module through an interface layer on one side to said live-scan device; electrically transmitting authentication data stored in said module; electrically transmitting an identifier stored in said module which uniquely identifies said module; entering a personal identification number; checking said identifier, personal identification information, and image against said authentication data.

According to another disclosed class of innovative embodiments, there is provided: a system of fingerprint authentication, comprising: a security token containing an optical path which can be connected to a light source and which includes an imprint platen on one side which allows light from said source to pass through and an interface layer on another side which allows an image of a fingerprint imprint on said imprint platen to pass to said image port; and a live-scan device which includes a fingerprint reader input, and a light source; wherein said token is inserted into said device, connecting said light source to said optical path, said image is received by said fingerprint reader input, and said fingerprint imprint is authenticated with a known imprint template.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, accurate authentication based on a fingerprint can be performed with only the minutia of a fingerprint being captured. Using only the minutia would allow the imprint capture area of the card to be smaller. Further, if only the minutia of the is stored as a template, a smart card would not require as much memory to store the template or processing time or power for verification.

For another example, the card can be designed such that its ergonomics require that the users thumb be on the platen for insertion and removal. Thus, a print can be obtained more quickly.

For another example, in addition to fingerprints, other biometric information can be sensed. Skin temperature, pulse, and even pore placement can be measured to provide an extra level of security by ensuring that a live person is requesting authorization.

For another example, the imprint capture algorithm used does not necessarily need to be WSQ. Many other algorithms for image compression make use of transform-domain data compression. Both Fast Fourier transforms and wavelets provide suitable properties for encoding images.

For another example, the LCD panels and strips described are used to either create or prevent reflectivity of a light source and imprint image. However, the LCD panels could be replaced by other electro-optically controlled transmissive arrays.

Imprints can be captured in a variety of ways. Waveguide holograms have been described. However, several other methods of illumination and capture of imprints, such as beamsplitting, total internal reflection, or direct illumination are just as effective.

A card approximately the size and shape of a credit card has been described. However, the credit card size and shape merely add a look of familiarity to the device. Cards somewhat smaller or larger could used. Moreover a card slightly thicker or thinner than current credit cards could also be utilized.

The "smart" card described can hold imprint template information. However, a magnetic strip can be employed to store the template information and relay it to the live-scan device for verification. Also, it is not necessary that the card hold the template at all. Especially in small applications, a database of a few dozen or even a few hundred imprints can be easily maintained and searched in a verification procedure.

Communication and data transfer between the card and the live-scan device is illustrated by electrical contacts. However, such communication and data transfer can also take place over a radio frequency connection.

Image transmission by fiber optics is generally illustrated as connecting to an image port on the bottom of the card relative to its insertion in the live-scan device. However, the fiber optics can transmit the image almost anywhere on the card.

What is claimed is:

1. A security token, comprising:
   a portable module having non-volatile memory containing an imprint template and an electrical interface that allows said imprint template to be read from said module;
   an imprint platen on one side of said module which allows light to pass through to illuminate an imprint on said platen;
   an offset optical path from said platen to an image port on the outside of said module which allows an image of an illuminated imprint on said platen to pass to said image port;
   an electro-optical material which controls the transmission of light from a light source such that a portion or portions of said imprint image are transmitted at a time.

2. The security token to claim 1, wherein said optical path comprises a fiber optic bundle.

3. The security token in claim 2, wherein said fiber optic bundle is coupled to, and transmits light through, an index matching doping material to illuminate said imprint.

4. The security token in claim 2, wherein said fiber optic bundle is coupled to, and transmits light through, a transmissive substrate and a waveguide hologram to illuminate and image said imprint.

5. The security token in claim 1, wherein said optical path comprises gradient index optical elements.

6. The security token of claim 1, wherein said optical path comprises:
   one or several fold mirrors; and
   an array of beam splitter optical elements comprising an electro-optical material that are configured to transmit light or reflect light in a sequence so as to transmit a portion of said imprint image at a time.

7. The security token of claim 1, wherein said electro-optic material is a liquid crystal display (LCD) that is generally opaque when electrically charged and generally transmissive when electrically neutral.

8. The security token of claim 1, wherein said image port is sized so as to allow only a portion of said imprint image to pass through at a time.

9. A method of fingerprint authentication, comprising:
   inserting a portable module into a live-scan device;
   illuminating, imaging, and transmitting a fingerprint on an imprint platen on one side of said module through an offset optical path to an image port; and
   electrically transmitting imprint authentication data from said module;
   wherein said optical path includes a electro-optical material which controls the transmission of light from a light source such that a portion or portions of said imprint image are transmitted at a time; and
   optically transmitting said image through the image port to the fingerprint reader input of said live-scan device for comparison to said authentication data.

10. The method of claim 9, wherein said illumination and imaging are accomplished using a light transmissive substrate and waveguide hologram.

11. The method of claim 9, wherein said optical path comprises a fiber optic bundle.

12. The method of claim 9, wherein said optical path comprises gradient index optical elements.

13. The method of claim 9, wherein said electro-optic material is a liquid crystal display (LCD) that is generally transmissive when electrically neutral, but all or portions of the LCD may be turned generally opaque by applying an electrical charge.

14. The method of claim 9, wherein said image portions are generated via an array of beam splitter optical elements comprising an electro-optical material such as a liquid crystal display (LCD) that is generally transmissive when electrically neutral, but may be turned generally opaque by applying an electrical charge, wherein said array of optical elements is configured to transmit light or reflect light in a sequence so as to transmit a portion of said imprint image at a time.

15. A security token, comprising:

a portable module having non-volatile memory containing an imprint template and an electrical interface that allows said imprint template to be read from said module;

an imprint platen on one side of said module which allows light to pass through to illuminate said imprint;

an offset optical path comprised of fiber optics from said platen to an image port on the outside of said module which allows an image of an illuminated imprint on said platen to pass to said image port;

wherein said fiber optic bundle is coupled to, and transmits light through, a transmissive substrate and a waveguide hologram to illuminate and image said imprint.

16. The security token of claim 15, further comprising an electro-optical material which controls the transmission of light from a light source such that a portion or portions of said imprint image are transmitted at a time.

17. The security token of claim 16, wherein said electro-optic material is a liquid crystal display (LCD) that is generally opaque when electrically charged and generally transmissive when electrically neutral.

* * * * *

UNITED STATES PATENT AND TRADEMARK OFFICE
CERTIFICATE OF CORRECTION

PATENT NO. : 6,182,892 B1
DATED : February 6, 2001
INVENTOR(S) : Michael F. Angelo, Mark B. Tellez and Steve H. Park It is certified that error appears in the above-identified patent and that said Letters Patent is hereby corrected as shown below:

<u>Column 12,</u>
Line 25, after token, change "to" to read -- of --;
Line 27, after token, change "in" to read -- of --;
Line 30, after token, change "in" to read -- of --;
Line 34, after token, change "in" to read -- of --; and
Line 58, after includes change "a" to read -- an --.

Signed and Sealed this

Twelfth Day of March, 2002

*Attest:*

*Attesting Officer*

JAMES E. ROGAN
*Director of the United States Patent and Trademark Office*